(12) United States Patent
Wong

(10) Patent No.: US 6,800,355 B2
(45) Date of Patent: Oct. 5, 2004

(54) INTERLAYERS FOR LAMINATED SAFETY GLASS WITH SUPERIOR DE-AIRING AND LAMINATING PROPERTIES AND PROCESS FOR MAKING THE SAME

(75) Inventor: Bert C. Wong, Marietta, OH (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/204,287
(22) PCT Filed: Mar. 29, 2001
(86) PCT No.: PCT/US01/10022
§ 371 (c)(1),
(2), (4) Date: Aug. 16, 2002
(87) PCT Pub. No.: WO01/72509
PCT Pub. Date: Oct. 4, 2001

(65) Prior Publication Data
US 2003/0022015 A1 Jan. 30, 2003

Related U.S. Application Data
(60) Provisional application No. 60/193,038, filed on Mar. 29, 2000.

(51) Int. Cl.[7] .............................................. B32B 17/10
(52) U.S. Cl. ........................ 428/141; 428/156; 428/172; 428/183; 428/436; 428/437; 428/441; 428/442; 156/102; 156/209
(58) Field of Search .................................. 156/102, 209; 428/141, 156, 172, 183, 436, 437, 441, 442

(56) References Cited

U.S. PATENT DOCUMENTS 5,455,103 A * 10/1995 Hoagland et al. ........... 428/167

* cited by examiner

Primary Examiner—D. S. Nakarani
(74) Attorney, Agent, or Firm—Kevin S. Dobson

(57) ABSTRACT

This invention relates to thermoplastic interlayers for laminated safety glass with superior vacuum de-airing at elevated temperatures and superior tacking and edge sealing properties. The sheeting has surface pattern on at least one of the surfaces characterized by flat surfaces with substantially uninterrupted channels for air flow in at least two intersecting directions. The channels allow for rapid de-airing while the area roughness parameter ratio $AR_p/AR_t$ in the range of 0.52 to 0.62, $AR_t$ being less than 32 $\mu$m, and area kurtosis less than 2.5, allow for ease of tacking of the interlayer onto glass and edge sealing after de-airing has been completed. Said surface pattern may also be superimposed onto a pattern which is generated by melt fracture or other means on at least one side to enhance de-airing and aid edge sealing.

7 Claims, 1 Drawing Sheet

INTERLAYERS FOR LAMINATED SAFETY GLASS WITH SUPERIOR DE-AIRING AND LAMINATING PROPERTIES AND PROCESS FOR MAKING THE SAME

This application claims the benefit of U.S. Provisional Application No. 60/193,038, filed Mar. 29, 2000.

BACKGROUND OF THE INVENTION

In the fabrication of laminated safety glass, it is customary to place a piece of thermoplastic sheeting between two pieces of float glass. It is also common that the thermoplastic interlayer's surface can be roughened to avoid blocking, i.e., one layer of interlayer sticking to another. The roughness on the interlayer can also allow the interlayer to be moved while the two pieces of glass are aligned as the glass/interlayer/glass sandwich (hereinafter, "assembly") is constructed. In constructing such an assembly, air is trapped in the interstitial space between the glass surface and the bulk of the thermoplastic interlayer. Trapped air can be removed either by vacuum de-airing or by nipping the assembly between a pair of rollers.

In the case of vacuum de-airing, air is removed while the assembly is at ambient temperature. Tacking of the interlayer to the glass and sealing of the edges is accomplished by heating the entire assembly while it is still under vacuum. The assembly, after the heating step, is generally referred to as a pre-press or a pre-laminate.

In the case of nipping, the assembly is generally heated to a temperature between 50–100° C., and is then passed through one or more sets of nip rolls. Edge sealing is accomplished by the force of the rollers exerted on the two pieces of glass. At the end of the nipping step, the assembly is called a pre-press. In windshield manufacture, the nip rolls are often articulated so as to accommodate the curvature in the windshield. When complex shapes and angles are involved, or when several models of windshields are made concurrently, it is often more convenient to use the vacuum de-airing method.

However, laminators may encounter a dilemma when selecting a suitable interlayer. It is sometimes difficult to choose an interlayer with optimal features for pre-pressing, namely, rapid air removal and proper edge seal. Interlayers which have rougher surfaces as measured by the 10-point roughness (ISO R468), Rz, can allow for faster de-airing. However, such interlayers can make it inconvenient to obtain edge seal as more energy is generally required to compact the rough interlayer. If the edges of the pre-press are not completely sealed, air can penetrate the edge in the autoclaving step where the pre-press is heated under high pressure, and can cause visual defects in the laminate which is commercially unacceptable. Laminators who use vacuum for de-airing in hot environments can have added difficulty. Interlayers that are rough and allow for rapid de-airing at about room temperature (23° C.) often do not de-air as well when the ambient temperature is much above 30° C.

On the other hand, relatively smooth interlayers can lead to the edges sealing before sufficient air is removed, and can leave air trapped inside the pre-press. This problem is commonly referred to as pre-mature edge seal, and can be especially common with PVB interlayers. During autoclaving, the excess air may be forced into solution under high pressure, but may return to the gas phase after autoclaving. Defects which occur after lamination are often more costly to rectify.

The thermoplastic interlayers of this invention allow for rapid de-airing even at high temperatures, and also allow good edge seal to be obtained.

SUMMARY OF THE INVENTION

In one aspect the present invention is a glass/adhesive sheet laminate comprising at least one layer of glass and a sheet of plastic interlayer, said plastic interlayer having at least one surface embossed with a pattern which provides relatively uninterrupted channels for de-airing in two intersecting directions, said channels having depth between 20 microns and 80 microns, and width 30 microns to 300 microns and spaced between 0.1 mm and 1 mm apart.

BRIEF DESCRIPTION OF THE DRAWINGS

Reference will be made to the accompanying drawings wherein.

DETAILED DESCRIPTION

Figure 1A:
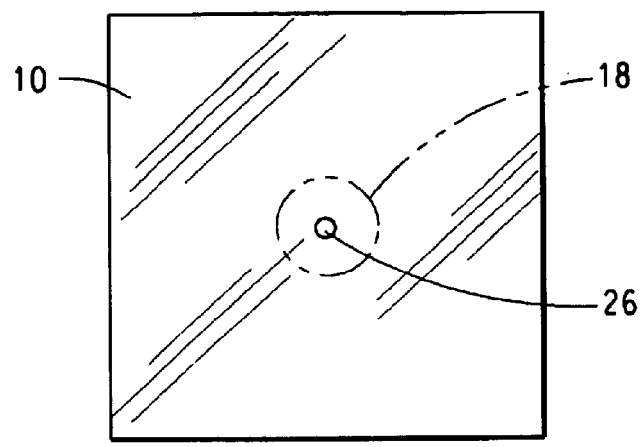
FIG. 1A is a representation of the top view of the glass/interlayer/glass assembly wherein the top piece of glass has a hole drilled through its center to enable interstitial pressure measurement.

Interlayers suitable for use in laminar structures comprising at least one ply of glass such as plasticized PVB sheeting and other thermoplastic interlayers are prepared by processes well known in the art. Preparation of plasticized PVB is disclosed in Phillips, U.S. Pat. No. 4,276,351 (Phillips), and by Hussey et al., WO 96/28504 (Hussey), for example. In Phillips, a compatible amount of tetraethylene glycol diethylhexanoate is used in admixture with PVB to plasticize the resin. In Hussey, an adhesion control agent is used in addition to a plasticizer to make a PVB sheet. A wide variety of adhesion control agents can be used with polyvinylbutyral sheeting. In the instant invention a PVB sheet plasticized with a compatible quantity of glycol ester selected from the group consisting of triethyleneglycol di-n-heptanoate and tetraethylene glycol di-n-heptanoate, or with a compatible quantity of branched or unbranched di-esters such as triethylene glycol di-2-ethylbutyrate and triethylene glycol di-2-ethylhexanoate, and contains as an adhesion control agent an alkali or alkaline earth metal carboxylate such as formate, acetate, and the like, or a combination thereof. A process for preparing such sheeting is disclosed in Moynihan, U.S. Pat. No. 4,292,372 (Moynihan). The teachings of Moynihan can be useful in the practice of the present invention. In Moynihan a hydrolyzable ester is used as a plasticizer in conjunction with an adhesion control agent. Other suitable adhesion control agents include, but are not limited to, potassium formate, potassium acetate, magnesium formate, magnesium acetate, magnesium neodecanoate, magnesium sulfate, and calcium or zinc salts of various organic and inorganic acids.

The interlayer includes an adhesion control agent to provide a preselected level of adhesion between said layer of glass and said interlayer which is suitable for use as automobile windshields and side windows and body glass, as windows and windshields for vehicles of transportation other than automobiles such as trains and buses, and as glazing material for buildings and architectural structures.

It is known that in order to effectively remove most of the air from between the surfaces in a PVB laminar structure, the surface of the PVB sheeting should be roughened. This can be effected by mechanically embossing or by melt fracture during extrusion of the PVB sheet followed by quenching so that the roughness is retained during handling. Retention of the surface roughness is essential in the practice of the present invention to facilitate effective removal of the entrapped air during laminate preparation.

Surface roughness, Rz, can be expressed in microns by a 10-point average roughness in accordance with ISO-R468 of the International Organization for Standardization and ASME B46.1 of the American Society of Mechanical Engineers. For sheeting having a thickness greater than about 0.76 mm, 10-point average roughness, Rz, of up to 80 µm is sufficient to prevent air entrapment. To prevent blocking a minimum roughness of about 20 µm is needed if the sheeting is to be wound up in a roll without interleaving or without anti-blocking agents. Channels on the surface to provide roughness have a depth of from about 20 to about 80 µm, preferably from about 25 to about 70 µm, more preferably from about 30 to about 60 µm. The width of the channels is from about 30 µm to about 300 µm, preferably from about 40 to about 250 µm, and more preferably from about 50 to about 200 µm. The surface channels are spaced between from about 0.1 mm to about 1 mm apart, preferably from about 0.1 to about 0.9 mm apart, more preferably from about 0.15 to about 0.85 mm apart.

Surface roughness, Rz, measurements from single-trace profilometer measurements can be adequate in characterizing the average peak height of a surface with roughness peaks and valleys that are nearly randomly distributed. However a single trace profilometer may not be sufficient to characterize the texture of a surface that has certain regularities, especially straight lines. In characterizing such surfaces, if care is taken such that the stylus of the surface texture instrument does not ride in a groove or on a plateau, the Rz thus obtained can still be a valid indication of the surface roughness. Other surface parameters, such as the mean spacing (R Sm) may not be accurate because they depend on the actual path traversed. Parameters like R Sm can change depending on the angle the traversed path makes with the grooves. Surfaces with regularities like straight-line grooves are better characterized by three-dimensional or area roughness parameters such as the area peak height, $AR_p$, and the total area roughness, $AR_t$, and the area kurtosis as defined in ASME B46.1. $AR_p$ is the distance between the highest point in the roughness profile over an area to the plane if all the material constituting the roughness is melted down. $AR_t$ is the difference in elevation between the highest peak and the lowest valley in the roughness profile over the area measured. In the instant invention, the surface pattern of the interlayer is characterized by $AR_t$ less than 32 µm, and the ratio of $AR_p$ to $AR_t$, also defined in ASME B46.1-1, is between 0.42 and 0.62, preferably 0.52 to 0.62. Said interlayer also has area roughness kurtosis less than 2.5.

A pre-press, as described hereinabove, can be measured for haze, and the haze values averaged. A pre-press having average haze of less than about 70% is preferable. A pre-press having average haze of less than about 50% is more preferred. A pre-press having average haze of less than about 20% is most preferred.

EXAMPLES

The following Examples and Comparative Examples are intended to be illustrative of the present invention, and are not intended in any way to limit the scope of the present invention.

In some of the examples of this invention, 100 parts of dry PVB flake of nominally 23% by weight of unbutyralated vinyl alcohol groups were mixed with 38–40 parts of tetraethylene glycol di-n-heptanoate plasticizer and one or more light stabilizers marketed under the tradename "Tinuvin" by Ciba-Geigy Co. and an antioxidant which were pre-mixed in the plasticizer continuously in a twin-screw extruder. The melt was forced through a slot die and formed a sheeting of 0.76 mm nominal thickness. In addition, agents for modifying surface energy of the bulk interlayer and usual adjuvants such as antioxidants, colorants and ultraviolet absorbers which do not adversely affect the functioning of the surface energy modifying agent and adhesion control agent can be included in the PVB composition. Commercially available interlayers such as Butacite® plasticized polyvinylbutyral resin sheeting available from the DuPont Company are used as starting materials in some of the examples.

Surface Roughness Characterization

Surface roughness, Rz, can be expressed in microns by a 10-point average roughness in accordance with ISO-R468 of the International Organization for Standardization. Roughness measurements are made using a stylus-type profilometer (Surfcom 1500A manufactured by Tokyo Seimitsu Kabushiki Kaisha of Tokyo, Japan) as described in ASME B46.1-1995 using a trace length of 26 mm. $AR_p$ and $AR_t$, and the area kurtosis are measured by tracing the roughness over a 5.6 mm×5.6 mm area in 201 steps using the Perthometer Concept system manufactured by Mahr GmbH, Gottingen, Germany.

De-Airing Efficiency at Room Temperature

Figure 1B:
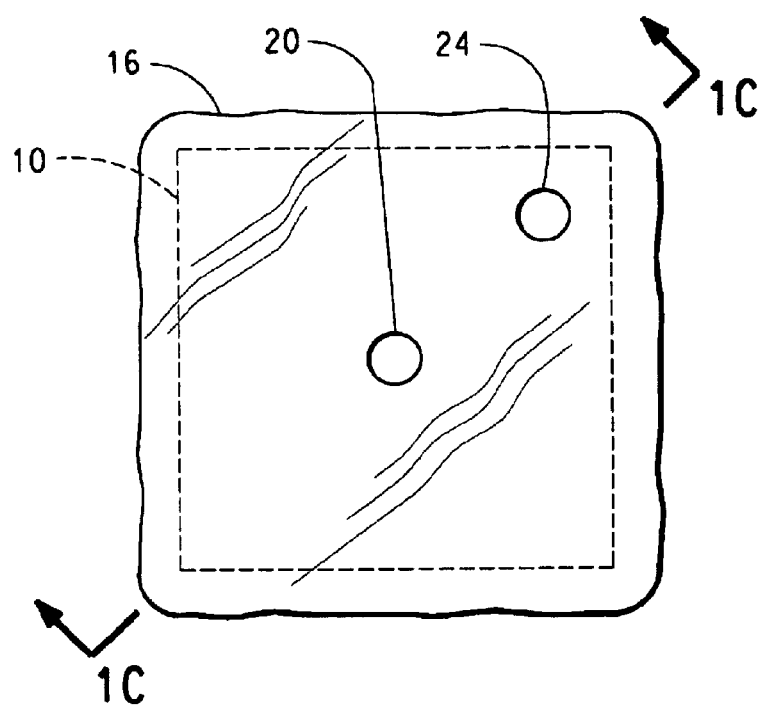
FIG. 1B is a depiction of the assembly placed inside a plastic bag through which holes are cut to allow the connection of couplers for attachment to the vacuum pump (24) and for attachment to the pressure gauge (20)
Figure 1C:
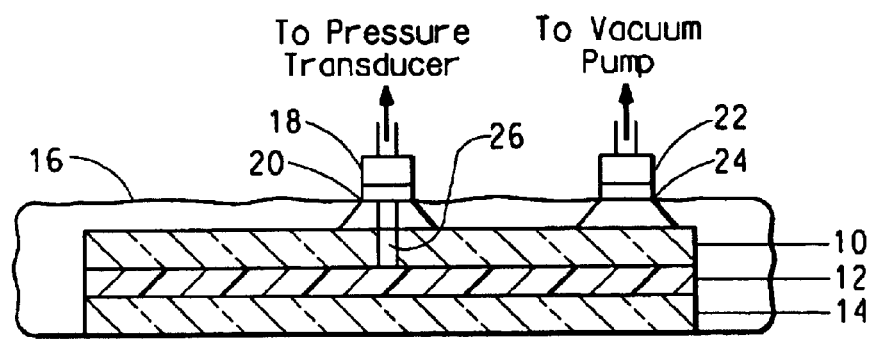
FIG. 1C is a cross-sectional view of the glass assembly inside the plastic bag along the section arrows "1C—1C".

De-airing efficiency of an interlayer with a specified pattern is determined using an apparatus which allows the absolute pressure of the interstitial space in an assembly to be measured. The interlayer to be tested is assembled as a normal assembly (FIG. 1A), except that the top plate of glass FIG. 1C (10) has a hole (26) drilled through its center. The glass (10, 14), the interlayer (12), and all auxiliary equipment must be equilibrated to 22.5±2.5° C. for one hour before testing. If an interlayer has two distinctly different patterns on either side, the side with the surface pattern to be evaluated is placed in contact with the piece of glass with a hole. The base of a pressure (or vacuum) coupler (18) is affixed and sealed around the hole (26) in the glass (10) (a vacuum coupler is a device which, when connected, enables air to move between an enclosure and the outside). A piece of fabric (about 30 mm wide) is wrapped around the edges of the assembly. The base of another vacuum coupler plate is placed on top of two layers of cotton fabric (50 mm×50 mm) in one of the corners. The assembly with the peripheral breather and two base plates of couplers are then placed inside a 0.1-mm thick nylon bag (16). The bag is then heat-sealed. Cross-marks are cut through the bag just above the base plates. Vacuum couplers are attached through the nylon bag and care is taken to ensure that there are no leaks, as shown in FIG. 1B. The corner plate (24) is attached to the vacuum source (nominally 84 kPa below atmospheric), while the center plate (20) is attached to a vacuum gauge or a calibrated pressure transducer. The gauge reading (or transducer output) is recorded at given intervals after the vacuum is applied. The recorded data contain the absolute interstitial pressure at 10-second intervals for the first minute after vacuum is applied, at 15-second intervals thereafter for one-half minute, at 30-second intervals thereafter for another one-half minute, and at one-minute intervals thereafter up to 10 minutes after the application of vacuum. A surface that allows for efficient vacuum de-airing would cause the absolute interstitial pressure to drop rapidly within a few minutes. The interstitial pressure at 90 seconds after evacuation is indicative of how well the interlayer de-airs. If at 90 seconds after evacuation, the absolute interstitial pressure is above 53.3 kPa, de-airing is inadequate, and the interlayer is not suitable for vacuum de-airing.

De-Airing Efficiency at Elevated Ambient Temperature

Determination of de-airing efficiency at high (elevated) ambient temperature is the same as that at room temperature, except that the interlayer to be tested, the glass, couplers are all equilibrated to 30.5±2.5° C. prior to testing. If at 90 seconds after evacuation, the absolute interstitial pressure is above 53.3 kPa, de-airing is inadequate, and the interlayer is not suitable for vacuum de-airing when the ambient temperature is elevated, as in the summer.

Pre-Press Haze Measurement

A pre-press is made from each PVB interlayer tested. The TAAT glass orientation is used. A PVB interlayer is placed between two pieces of glass, the excess interlayer is trimmed. The glass/PVB/glass sandwich, referred to as an assembly, is placed in a 0.1-mm (nylon) plastic bag. A vacuum adapter allows a vacuum hose to be connected to the inside of the plastic bag after it is sealed. The bag with the assembly inside is evacuated for 90 seconds at 53.3 kPa vacuum (48.0 kPa absolute pressure) at ambient temperature (22.5° C.±2.5° C.). After the initial vacuum, the nylon bag and its contents and the vacuum hose is placed inside an oven kept at 120–122° C. for 6 minutes. Vacuum is supplied from a vacuum pump via a hose that runs through the oven so that there is no interruption in the vacuum as the assembly is placed into the oven. At the end of the six minutes in the oven, the nylon bag is removed from the oven and the vacuum hose is disconnected immediately. The glass/PVB/glass structure at this stage is called a pre-press. Depending on the starting interlayer roughness, the pre-press may appear hazy or clear. Haze is measured by using a Hazegard hazemeter from Gardner in eight places in the pre-press. The results can be averaged.

Comparative Example C1

Polyvinyl butyral (PVB) interlayer available commercially from E. I. DuPont de Nemours & Co. as Butacite® B-142 was characterized. Surface roughness was generated by melt fracture. The roughness parameters of the surface pattern are shown in Table 1. The de-airing characteristics at room temperature and at elevated ambient temperature were determined in the tests outlined above. Separately, a pre-press was prepared using the conditions specified above. Results are shown in Table 1.

Comparative Example C2

PVB interlayer available commercially from E. I. DuPont de Nemours & Co. as Butacite® BE-1990 was characterized. Surface roughness was generated by melt fracture. Its roughness parameters are shown in Table 1. Its de-airing characteristics at room temperature and at elevated ambient temperature were determined in the tests outlined above. Separately, a pre-press was prepared using the conditions specified above. Results are shown in Table 1.

Example 1

The interlayer from Comparative Example C1 was placed between two rubber plates. The rubber surfaces in contact with the PVB interlayer were engraved with a pattern with ridges that form a grid pattern. The ridges were approximately 12 $\mu$m in width and 45 $\mu$m in height, and were spaced such that there were approximately 9 grids per square mm. The rubber/PVB/rubber sandwich assembly was placed between two pieces of nominally 3.2-mm thick annealed glass. The 5-ply sandwich was put inside of a woven nylon bag, and the nylon bag and its contents were placed inside of a rubber vacuum bag. The rubber vacuum bag was fitted with a piece of tubing which was sealed through the edge of the bag, and which enabled connection to a vacuum source. The open end of the vacuum bag was closed. Vacuum (at least 80 kPa below atmospheric) at ambient temperature (22.5±2.5° C.) was applied for 5 minutes. Immediately thereafter, the vacuum bag with its contents was placed in an oven at 120° C. for 40 minutes. After that time, the vacuum bag was removed from the oven. Vacuum was disconnected, and the vacuum bag and its contents were allowed to cool to room temperature. One of the engraved rubber plates was gently removed to expose the now embossed PVB interlayer. The PVB interlayer was then gently peeled off from the second embossed rubber plate. The embossed pattern on the PVB interlayer was grid-like with channels approximately 12 $\mu$m wide and 41 $\mu$m deep, and with approximately 9 grids per square mm. The roughness parameters are shown in Table 1. The de-airing performance at room temperature and elevated ambient temperature, and pre-pressing characteristics are shown in Table 1.

Comparative Example C3

100 Parts by weight polyvinyl butyral are mixed in an extruder with 38.5 parts of tetraethylene glycol di-heptanoate plasticizer doped with antioxidants (octylphenol) and ultraviolet light stabilizer (Tinuvin P, Ciba Geigy). The admixture was forced through a slit-die so that it becomes a nominally 0.76 mm sheeting. Agents for controlling adhesion to glass and surface tension of the bulk interlayers were added in quantities to make the interlayer suitable for use in automobiles. Immediately exiting the die, the molten plasticized PVB sheet was calendered between a quench drum and an embossing roll made of silicone rubber. The surface of the quench drum was sandblasted and transferred a random pattern with an Rz of approximately 30 $\mu$m onto the PVB interlayer. The embossing roll was engraved with a pattern similar to that on the quench drum. Roughness parameters for the rubber-embossed surface are shown in Table 1. The de-airing performance of the rubber-embossed surface at room temperature and elevated ambient temperature are also shown in Table 1, as is the haze of the pre-press from this interlayer.

Example 2

The interlayer used in this example was prepared in the same way as that in Comparative Example C3 except that the rubber embossing roll was engraved with a pattern like those on the rubber sheets used in Example 1. One side of this interlayer had the regular grid-like pattern from the rubber-embossing roll while the other side had the random, sandblasted pattern from the quench drum. The roughness, Rz, of the rubber embossed surface of this PVB interlayer was about 40 $\mu$m. The de-airing performance of the rubber-embossed surface at room temperature and elevated ambient temperature are shown in Table 1 as is the haze of the pre-press from this interlayer.

TABLE 1

| Example | Rz ($\mu$m) | $AR_t$ ($\mu$m) | $AR_p$ ($\mu$m) | Ratio $AR_p$ / $AR_t$ | Area Kurtosis | Room Temperature De-Airing* | Elevated[+] Ambient Temperature De-Airing | Pre-Press Haze (%) |
|---|---|---|---|---|---|---|---|---|
| C1 | 41.8 | 54.17 | 35.87 | 0.662 | 3.46 | 42.3 | 64.2 | 49.2 |
| C2 | 62.6 | 74.99 | 48.14 | 0.642 | 3.12 | 36.9 | 61.0 | 62.3 |
| 1 | 39.6 | 48.32 | 29.33 | 0.607 | 1.78 | 16.2 | 16.5 | 11.7 |

TABLE 1-continued

| Example | Rz (μm) | AR$_t$ (μm) | AR$_p$ (μm) | Ratio AR$_p$/AR$_t$ | Area Kurtosis | Room Temperature De-Airing* | Elevated+ Ambient Temperature De-Airing | Pre-Press Haze (%) |
|---|---|---|---|---|---|---|---|---|
| C3 | 49.0 | 66.03 | 44.95 | 0.681 | 1.92 | 49.1 | 73.4 | 24.5 |
| 2 | 39.2 | 47.90 | 28.70 | 0.599 | 1.93 | 16.9 | 24.0 | 13.3 |

*Absolute interstitial pressure (kPa) after 90 seconds of evacuation at 22.5 ± 2.5° C.
+Absolute interstitial pressure (kPa) after 90 seconds of evacuation at 30.5 + 0.2.5° C.

What is claimed is:

1. A glass/adhesive sheet laminate comprising at least one layer of glass and a sheet of plastic interlayer, said plastic interlayer having at least one surface with a pattern which provides relatively uninterrupted channels for de-airing in at least two intersecting directions, said channels having depth between 20 μm and 80 μm, and width 30 μm to 300 μm and spaced between 0.1 mm and 1 mm apart.

2. A plastic interlayer as in claim 1 having roughness parameters such that the area roughness peak height, AR$_p$, is less than 32 μm, and the ratio of the of AR$_p$ to the total area roughness, AR$_t$ is between 0.52 and 0.62, and the area kurtosis is less than 2.5.

3. The laminar structure of claim 1 wherein said interlayer is an ionomeric polymer.

4. The laminar structure of claim 1 wherein said interlayer is a polyvinylbutyral (PVB) sheeting plasticized with one or more glycol-di-ester plasticizers and contains suitable amounts of adhesion control additive and surface active agents.

5. The laminar structure of claim 4 wherein said adhesion control agent is a potassium or an alkali earth metal salt of an organic acid or inorganic acid, or a combination thereof.

6. A process for imparting the surface pattern onto the interlayer in claim 1 where the pattern is transferred via embossing an interlayer material with an existing pattern.

7. A process for imparting the surface pattern onto the interlayer in claim 1 whereby the molten interlayer is calendered between embossing rolls, at least one of the rolls is engraved with the pattern described in claim 1.

* * * * *